US012341914B2

United States Patent
Wu

(10) Patent No.: US 12,341,914 B2
(45) Date of Patent: Jun. 24, 2025

(54) KEY GENERATION UNIT WITH PHYSICAL UNCLONABLE FUNCTION, KEY GENERATOR AND CIRCUIT SYSTEM

(71) Applicant: NUVOTON TECHNOLOGY CORPORATION, Hsinchu (TW)

(72) Inventor: Ming-Hung Wu, Hsinchu Science Park (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 238 days.

(21) Appl. No.: 17/979,329

(22) Filed: Nov. 2, 2022

(65) Prior Publication Data
US 2023/0403165 A1 Dec. 14, 2023

(30) Foreign Application Priority Data
Jun. 14, 2022 (TW) .................................. 111122035

(51) Int. Cl.
*H04L 9/32* (2006.01)
*H04L 9/08* (2006.01)

(52) U.S. Cl.
CPC .......... *H04L 9/3278* (2013.01); *H04L 9/0861* (2013.01); *H04L 9/0866* (2013.01)

(58) Field of Classification Search
CPC .... H04L 9/3278; H04L 9/0866; H04L 9/0861
See application file for complete search history.

(56) References Cited

U.S. PATENT DOCUMENTS

| | | | |
|---|---|---|---|
| 2013/0194886 A1* | 8/2013 | Schrijen ................ | H04L 9/0866 365/226 |
| 2015/0061740 A1* | 3/2015 | Balasubramanian ........................ | G01R 31/318541 327/202 |
| 2016/0204781 A1* | 7/2016 | Plusquellic .............. | H03K 3/84 326/8 |
| 2018/0293052 A1* | 10/2018 | Suresh ..................... | G06F 7/588 |
| 2021/0083868 A1* | 3/2021 | Lee ................. | G01R 31/318588 |
| 2021/0152349 A1* | 5/2021 | Van Der Sluis .......... | H04L 9/08 |
| 2021/0250188 A1* | 8/2021 | Schat ....................... | G06F 7/588 |
| 2023/0125166 A1* | 4/2023 | Katkoori .................. | H03K 3/84 726/34 |

(Continued)

OTHER PUBLICATIONS

Zheng, Yu; Krishna, Aswin Raghav; Bhunia, Swarup; "ScanPUF: Robust ultralow-overhead PUF using scan chain," 18th Asia and South Pacific Design Automation Conference (ASP-DAG), Yokohama, Japan, Jan. 22-25, 2013, pp. 626-631.*

(Continued)

*Primary Examiner* — Victor Lesniewski
(74) *Attorney, Agent, or Firm* — MUNCY, GEISSLER, OLDS & LOWE, P.C.

(57) ABSTRACT

A key generation technology of the present disclosure does not additionally set a combinational logic circuit on an original path of a scanning flip-flop, but utilizes a plurality of existing combinational logic circuits in a circuit system to generate multiple values of a key. Correspondingly, a key generation unit used in the key generation technology has two data flip-flops. One of the data flip-flops is used as a data flip-flop in one of a plurality of scanning flip-flops. The other data flip-flop is to obtain a node data signal of a node in the corresponding combinational logic circuit as one of the values of the key.

20 Claims, 7 Drawing Sheets

(56) References Cited

U.S. PATENT DOCUMENTS

2023/0315960 A1* 10/2023 Wang .................... G06F 30/333
                                                                              716/136

OTHER PUBLICATIONS

Nagesh, B.; Chandra, B. S. Nikhil; "Design of Efficient Scan Flip-Flop," International Conference on Recent Trends on Electronics, Information, Communication & Technology (RTEICT), Bangalore, India, Aug. 27-28, 2021, pp. 146-150.*

* cited by examiner

KEY GENERATION UNIT WITH PHYSICAL UNCLONABLE FUNCTION, KEY GENERATOR AND CIRCUIT SYSTEM

CROSS-REFERENCE TO RELATED APPLICATION

This application claims the priority from TW Patent Application No. 111122035, filed on Jun. 14, 2022, and all contents of such TW Patent Applications are included in the present disclosure.

BACKGROUND

1. Field of the Invention

The present disclosure relates to a key generation technology with a physical unclonable function (PUF), in particular to, a key generation unit that achieves a physical unclonable function, a key generator having a plurality of key generation units, and a circuit system having the key generator.

2. Description of the Related Art

At present, information security has become a topic of concern to everyone. For instance, in the application fields of Internet of things (IoT), artificial intelligence (AI) and mobile payment are indispensable from the needs of information security. In the classification of information security, the most difficult item to hack is the part of a hardware layer. Thus, information security personnel have also begun to pay attention to the part of the hardware security protection. In the existing hardware security protection architecture, such as Advanced Encryption Standard (AES), hash and other digital encryption algorithms, a key is most often utilized to encrypted plaintext into ciphertext. As well, the decryption of the ciphertext also requires this key to be restored to plaintext. As a result, how to protect this key is a branch of knowledge.

A physical unclonable function is one way to protect this key. The main reason is that the key is generated by using a variation of a semiconductor process by an operational variable to obtain a key value. Therefore, each integrated circuit has a unique key. In the related art, a combinational logic circuit is added between scanning flip-flops in a circuit system with a design for testability to create unpredictable and uncontrollable variables, which is utilized to generate a unique key that cannot be physically cloned.

Referring to FIG. 1, FIG. 1 is a schematic circuit diagram of a conventional key generator by adding a logic circuit between scanning flip-flops in a circuit system. A circuit system with the design for testability has, for example, scanning flip-flops $SFF_{j-1}$, $SFF_j$ and $SFF_{j+1}$. A combinational logic circuit $CBC_{j-1}$ is configured between the scanning flip-flops $SFF_{j-1}$ and $SFF_j$, and a combinational logic circuit $CBC_j$ is configured between the scanning flip-flops $SFF_j$ and $SFF_{j+1}$, so as to implement a conventional key generator in the circuit system. Additionally, inverters $INV_1$ and $INV_2$ are coupled between the scanning flip-flops $SFF_{j-1}$ and $SFF_j$, and inverters $INV_3$ and $INV_4$ are coupled between the scanning flip-flops $SFF_j$ and $SFF_{j+1}$, so as to delay the transmission of a scanning serial data signal SI to the scanning flip-flops $SFF_j$ and $SFF_{j+1}$. The scanning flip-flop $SFF_{j-1}$ comprises a multiplexer MX and a data flip-flop (D flip-flop) DFF. The multiplexer MX is configured to receive a scanning enable signal SE to output a data signal D or the scanning serial data signal SI received by the multiplexer MX to the data flip-flop DFF. Usually, the data flip-flop DFF is rising edge triggered. When a clock signal CK is changed from a logic low level to a logic high level, the data flip-flop DFF outputs the received data signal D or the scanning serial data signal SI. Besides, the scanning flip-flops $SFF_j$ and $SFF_{j+1}$ can be deduced by analogy.

In the case of the scanning enable signal SE being enabled (the logic high level), after the clock signal CK passes through three cycles (that is, the number of times the clock signal CK is changed from the logic low level to the logic high level is three times), values stored by the scanning flip-flops $SFF_{j-1}$, $SFF_j$ and $SFF_{j+1}$ are respectively three consecutive values of the scanning serial data signal SI, such as 0, 1, and 1. Next, in the case of the scanning enable signal SE being disabled (the logic low level), the clock signal CK passes through two clock cycles (assuming that the design for testability adopts a launch on capture (LOC) mechanism), the value of the scanning flip-flop $SFF_j$ is generated by the value 0 of the scanning flip-flop $SFF_{j-1}$ through the combinational logic circuit $CBC_{j-1}$, and the value of the scanning flip-flop $SFF_{j+1}$ is generated by the value 1 of the scanning flip-flop $SFF_j$ through the combinational logic circuit $CBC_j$. At the same time, the values of the scanning flip-flops $SFF_j$ and $SFF_{j+1}$ can be configured as at least a part of the multiple values of the key. In this conventional key generator, the combinational logic circuits $CBC_{j-1}$ and $CBC_j$ are coupled in the original path of the plurality of scanning flip-flops $SFF_{j-1}$, $SFF_j$ and $SFF_{j+1}$. Hence, a timing of a scan verification may be affected. In other words, there is a need to provide a key generator in a circuit system that incorporates the design for testability without affecting the scan verification.

SUMMARY

An embodiment of the present disclosure provides a key generation unit with a physical unclonable function. The key generation unit comprises a multiplexer, a first data flip-flop and a second data flip-flop. The multiplexer is electrically connected to one of a plurality of combinational logic circuits in a circuit system. The multiplexer is configured to output a data signal or a scanning data signal received by the multiplexer based on a scanning enable signal. Also, the data signal is from an output end of the one of the combinational logic circuits. The first data flip-flop is electrically connected to the multiplexer. The first data flip-flop is configured to output the data signal or the scanning serial data signal received by the multiplexer. As well, the first data flip-flop outputs the data signal or the scanning serial data signal received by the first data flip-flop based on an edge of a clock signal being triggered. The multiplexer and the first data flip-flop form one of a plurality of scanning flip-flops in the circuit system. The second data flip-flop is electrically connected to the one of the combinational logic circuits, and the second data flip-flop is configured to receive a node data signal of a node in the one of the combinational logic circuits. Also, when the scanning enable signal is disabled, the second data flip-flop outputs the node data signal received as a part of a key based on an edge of a node clock signal being triggered. Moreover, the node clock signal is the clock signal, or the node clock signal is generated based on the clock signal. A first transmission delay time from an input end of the one of the combinational logic circuits to the node of the one of the combinational logic circuits is K times a second transmission delay time from the input end of the one of the combinational logic circuits to the output end of the one of the combinational logic circuits. Besides, K is less than 1.

An embodiment of the present disclosure also provides a key generator. The key generator comprises a plurality of key generation units. Each of the plurality of key generation units is the same as the preceding key generation unit. The one of the combinational logic circuits to which one of the plurality of key generation units is electrically connected is different from another one of the combinational logic circuits to which another one of the plurality of key generation units is electrically connected.

An embodiment of the present disclosure further provides a circuit system. The circuit system comprises the preceding key generator, the plurality of preceding combinational logic circuits and the plurality of preceding scanning flip-flops. The plurality of combinational logic circuits are electrically connected to the plurality of key generation units of the key generator. The plurality of scanning flip-flops are electrically connected to the plurality of combinational logic circuits.

As state above, the key generation unit, the key generator and the circuit system provided by the embodiments of the present disclosure with the physical unclonable function does not have the problem of timing errors caused during the scan verification in the related art.

To further understand the technology, means, and effects of the present disclosure, reference may be made by the detailed description and drawing as follows. Accordingly, the purposes, features and concepts of the present disclosure can be thoroughly and concretely understood. However, the following detail description and drawings are only used to reference and illustrate the implementation of the present disclosure, and they are not used to limit the present disclosure.

BRIEF DESCRIPTION OF THE DRAWINGS

The drawings are provided to make the persons with ordinary knowledge in the field of the art further understand the present disclosure, and are incorporated into and constitute a part of the specification of the present disclosure. The drawings illustrate demonstrated embodiments of the present disclosure, and are used to explain the principal of the present disclosure together with the description of the present disclosure.

DESCRIPTION OF THE PREFERRED EMBODIMENTS

Figure 1:
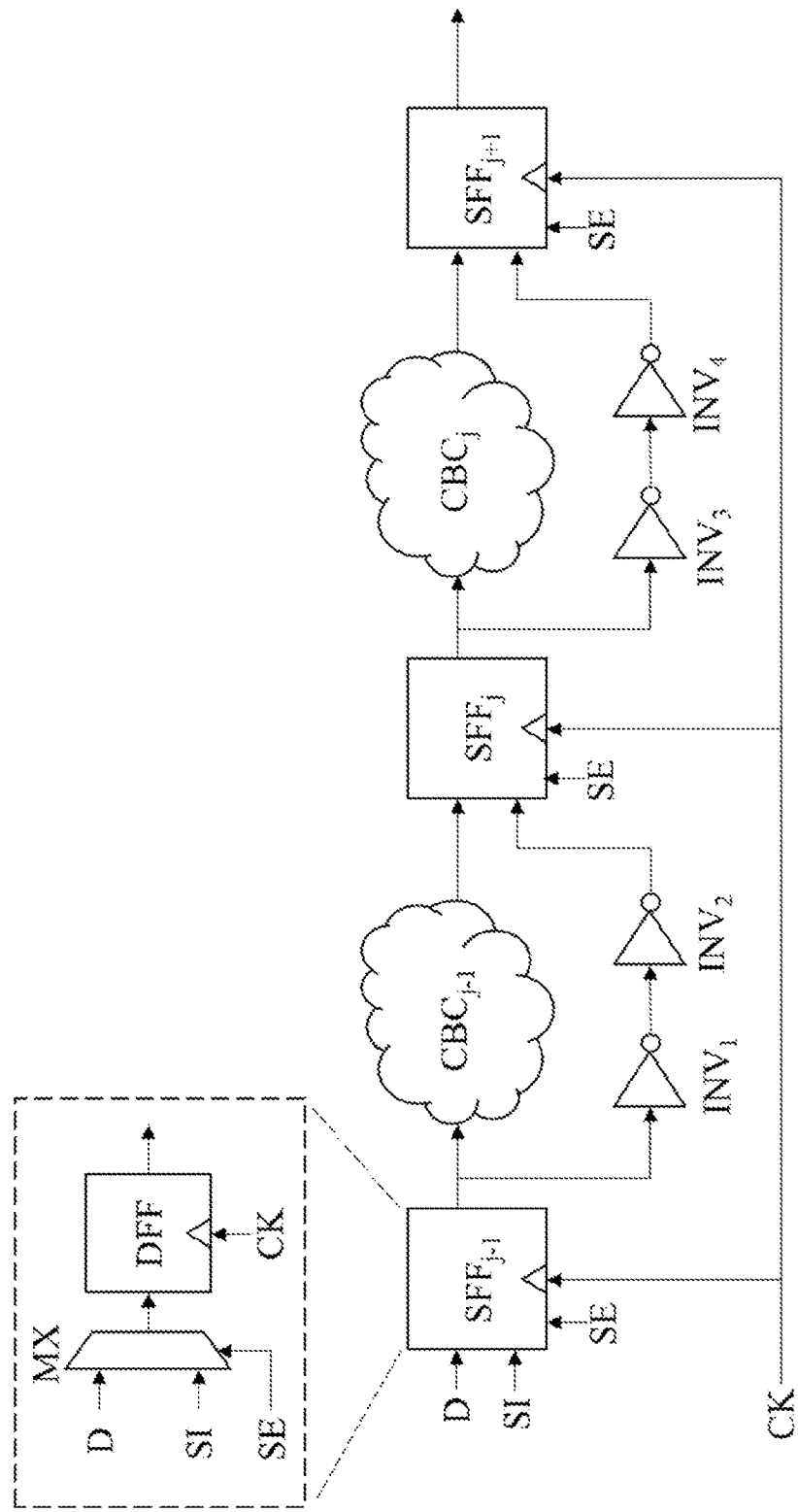
FIG. 1 is a schematic circuit diagram of a key generator implemented by adding a combinational logic circuit between scanning flip-flops in a circuit system of a related art.

The embodiments of the present disclosure are described in detail as reference, and the drawings of the present disclosure are illustrated. In the case of possibility, the element symbols are used in the drawings to refer to the same or similar components. In addition, the embodiment is only one approach of the implementation of the design concept of the present disclosure, and the following multiple embodiments are not intended to limit the present disclosure.

An embodiment of the present disclosure provides a key generation technology that can be combined in a scan verification of a design for testability to generate a key, which adopts a mechanism of a launch on capture (LOC) or a launch off shift (LOS) to perform the scan verification. At the same time, the key is obtained. Further, the key generation technology of an embodiment of the present disclosure does not additionally set a combinational logic circuit on an original path of scanning flip-flops. Instead, a plurality of existing combinational logic circuits in a circuit system is utilized to generate multiple values of the key. Correspondingly, a key generation unit adopted by the key generation technology has two data flip-flops. One of the data flip-flops is configured as a data flip-flop of a plurality of scanning flip-flops, and the other data flip-flop is configured to obtain a node data signal of a node in the corresponding combinational logic circuit as one of the values of the key.

Correspondingly, when a scanning enable signal is disabled, a length of a duty cycle of a clock signal must be designed to be sufficient. It is ensured that the combinational logic circuit has sufficient time for the node data signal to be transitioned based on a scanning serial data signal which is input into the combinational logic circuit. The length of the duty cycle of the clock signal refers to the length of time during which the clock signal is enabled (usually a logic high level) in one cycle. Therefore, a transmission delay time from an input end of the combinational logic circuit to a node corresponding to the node data signal of the combinational logic circuit is K times a transmission delay time from the input end of the combinational logic circuit to an output end of the combinational logic circuit. As well, when the scanning enable signal is disabled, a duty cycle of the clock signal is not less than K times the transmission delay time from the input end of the combinational logic circuit to the output end of the combinational logic circuit (that is, not less than the transmission delay time of the node corresponding to the node data signal). Besides, K is less than 1.

For example, the transmission delay time of each node of the combinational logic circuits can be obtained through static timing analysis. Then, the duty cycle of the clock signal is determined based on the transmission delay time of the selected node. Alternatively, in the duty cycle of the determined clock signal, the corresponding node in the combinational logic circuits is obtained through static timing analysis. From the above description, it can be known that the technical solution of the present disclosure does not need to set a combinational logic circuit on the original path of the plurality of scanning flip-flops. Therefore, it does not affect the timing of the scan verification.

Figure 2:
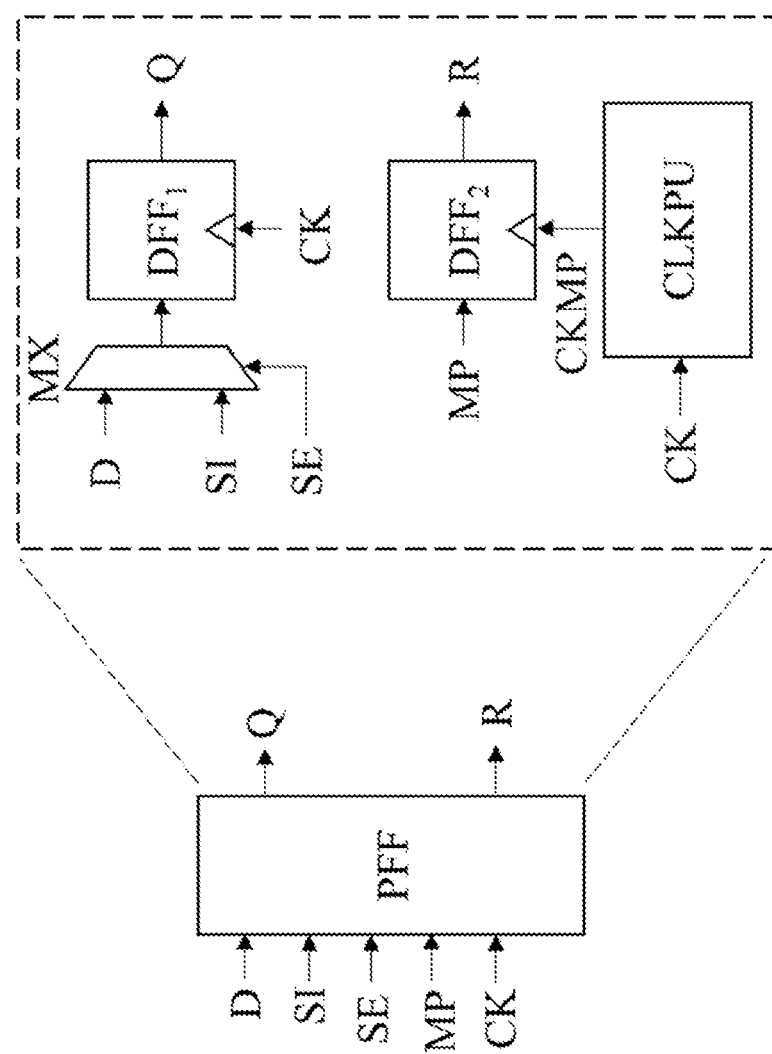
FIG. 2 is a key generation unit with a physical unclonable function according to an embodiment of the present disclosure.

Referring to FIG. 2, FIG. 2 is a key generation unit with a physical unclonable function according to an embodiment of the present disclosure. The present disclosure mainly forms a key generation unit PFF by sharing a scanning flip-flop and a plurality of existing combinational logic circuits in a circuit system. The key generation unit PFF comprises a multiplexer MX, data flip-flops $DFF_1$, $DFF_2$ and a clock signal processing unit CLKPU. The multiplexer MX is electrically connected to one of the plurality of combinational logic circuits in the circuit system. The multiplexer MX is configured to output a data signal D or a scanning serial data signal SI received by the multiplexer MX based on a scanning enable signal SE. The data signal D is from an output end of the one of the combinational logic circuits. Besides, one end of the multiplexer MX receiving the scanning serial data signal SI is electrically connected to an output end of the previous-stage scanning flip-flop.

The data flip-flop $DFF_1$ is electrically connected to the multiplexer MX. The data flip-flop $DFF_1$ is configured to receive the data signal D or the scanning serial data signal SI. The data flip-flop $DFF_1$ outputs the data signal D or the scanning serial data signal SI received by the data flip-flop $DFF_1$ based on an edge of a clock signal CK being triggered. When the scanning enable signal SE is disabled, the data flip-flop $DFF_1$ outputs the data signal D received by the data flip-flop $DFF_1$ based on the edge of the clock signal CK. Instead, when the scanning enable signal SE is enabled, the data flip-flop $DFF_1$ outputs the scanning serial data signal SI received by the data flip-flop $DFF_1$ based on the edge of the clock signal CK. A combination of the multiplexer MX and the data flip-flop $DFF_1$ is configured to form one of the plurality of scanning flip-flops. An output signal of the data flip-flop $DFF_1$ is output to an input end of the next-stage combinational logic circuit or is configured as a serial data signal of the next-stage scanning flip-flop.

The data flip-flop $DFF_2$ is electrically connected to the one of the combinational logic circuits. The data flip-flop $DFF_2$ is configured to receive a node data signal MP of a node in the one of the combinational logic circuits. When the scanning enable signal SE is disabled, the data flip-flop $DFF_2$ outputs the node data signal MP received by the data flip-flop $DFF_2$ as a part of a key (that is, as a value R of the key) based on an edge of a node clock signal CKMP being triggered. The node clock signal CKMP is generated based on the clock signal CK. A transmission delay time from an input end of the one of the combinational logic circuits to a node of the one of the combinational logic circuits is K times a transmission delay time from the input end of the one of the combinational logic circuits to the output end of the one of the combinational logic circuits. When the scanning enable signal SE is disabled, a duty cycle of the clock signal CK is not less than K times the transmission delay time from the input end of the one of the combinational logic circuits to the output end of the one of the combinational logic circuits. Besides, K is less than 1. For instance, K may be greater than or equal to 0.5, but the present disclosure is not limited thereto.

The clock signal processing unit CLKPU is electrically connected to the data flip-flop $DFF_2$. The data flip-flop $DFF_2$ is configured to generate the node clock signal CKMP based on the scanning enable signal SE and the clock signal CK. In one embodiment of the present disclosure, the data flip-flops $DFF_1$ and $DFF_2$ are both rising edge triggered. In another embodiment of the present disclosure, the data flip-flop $DFF_1$ is designed to be rising edge triggered, and the data flip-flop $DFF_2$ is designed to be falling edge triggered. At this time, the clock signal processing unit CLKPU can be selectively not provided, and the clock signal CK can be configured as the node clock signal CKMP (that is, the node clock signal CKMP is the clock signal CK).

Figure 3:
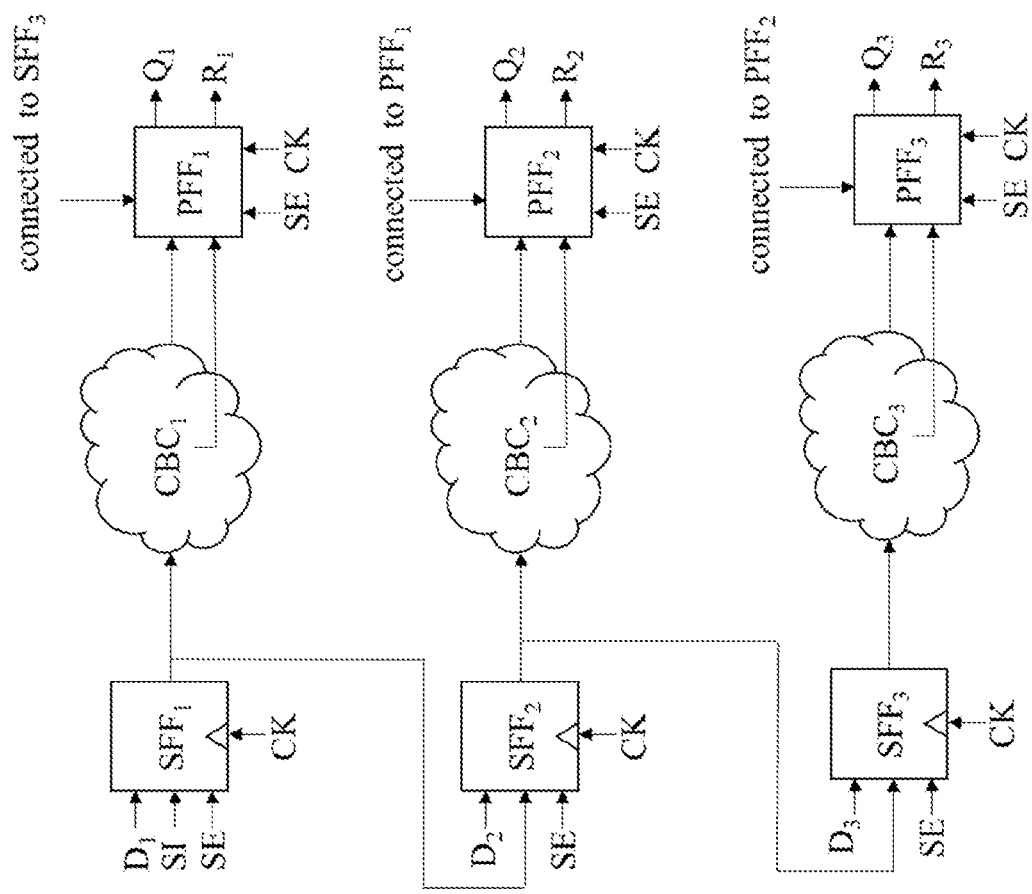
FIG. 3 is a key generator with a physical unclonable function in a circuit system according to an embodiment of the present disclosure.

Referring to FIG. 3, FIG. 3 is a key generator with a physical unclonable function in a circuit system according to an embodiment of the present disclosure. In this embodiment, a circuit system comprises a generator comprising a plurality of key generation units $PFF_1$, $PFF_2$ and $PFF_3$, a plurality of existing combinational logic circuits $CBC_1$, $CBC_2$, $CBC_3$ and a plurality of scanning flip-flops $SFF_1$, $SFF_2$ and $SFF_3$ (each of the key generation units $PFF_1$, $PFF_2$ and $PFF_3$ also comprises a scanning flip-flop). The scanning flip-flops of the key generation units $PFF_1$, $PFF_2$ and $PFF_3$ and the scanning flip-flops $SFF_1$, $SFF_2$ and $SFF_3$ are all formed based on the design for testability, which can be configured to perform the scan verification in the circuit system. The structure of each of the scanning flip-flops $SFF_1$, $SFF_2$ and $SFF_3$ is as described as above, and each of the scanning flip-flops is comprised with a multiplexer and a data flip-flop, so it is not repeated here. In addition, circuits of the key generator and the scanning flip-flops $SFF_1$, $SFF_2$ and $SFF_3$ can be implemented through an automatic placement and routing (APR) and a field programmable gate array (FPGA) technology, but the present disclosure is not limited thereby.

In this embodiment, the scanning flip-flop $SFF_1$ is configured to receive a data signal $D_1$, the scanning serial data signal SI, the clock signal CK and the scanning enable signal SE. An output end of the scanning flip-flop $SFF_1$ is electrically connected to an input end of the combinational logic circuit $CBC_1$ and one end of the scanning flip-flop $SFF_2$ configured to receive the scanning serial data signal SI. The scanning flip-flop $SFF_2$ is configured to receive a data signal D2, the scanning serial data signal SI through the scanning flip-flop $SFF_1$, the clock signal CK and the scanning enable signal SE. An output end of the scanning flip-flop $SFF_2$ is electrically connected to an input end of the combinational logic circuit $CBC_2$ and one end of the scanning flip-flop $SFF_3$ configured to receive the scanning serial data signal SI. The scanning flip-flop $SFF_3$ is configured to a data signal $D_3$, the scanning serial data signal SI through the scanning flip-flop $SFF_2$, the clock signal CK and the scanning enable signal SE. An output end of the scanning flip-flop $SFF_3$ is electrically connected to an input end of the combinational logic circuit $CBC_3$ and one end of the scanning flip-flop of the key generation unit $PFF_1$ configured to receive the scanning serial data signal SI.

The scanning flip-flop of the key generation unit $PFF_1$ is configured to receive an output data signal of the combinational logic circuit $CBC_1$, the scanning serial data signal SI through the scanning flip-flop $SFF_3$, the clock signal CK and the scanning enable signal SE. The scanning flip-flop of the key generation unit $PFF_1$ also outputs a signal $Q_1$. The key generation unit $PFF_1$ is also electrically connected to a node of the combinational logic circuit $CBC_1$ to receive a node data. Then, the key generation unit $PFF_1$ outputs a value $R_1$ of the key based on the clock signal CK. The signal $Q_1$ may be configured as an input signal of other combinational logic circuits (if the circuit system still has other combinational logic circuits not shown in FIG. 3), or configured as the scan verification.

The scanning flip-flop of the key generation unit $PFF_2$ is configured to receive an output signal of the combinational logic circuit $CBC_2$, the scanning serial signal SI through the scanning flip-flop of the key generation unit $PFF_1$, the clock signal CK and the scanning enable signal SE. The scanning flip-flop of the key generation unit $PFF_2$ also outputs a signal $Q_2$. The key generation unit $PFF_2$ is also electrically connected to a node of the combinational logic circuit $CBC_2$ to receive a node data. The key generation unit $PFF_2$ outputs a value $R_2$ of the key based on the clock signal CK. The signal $Q_2$ may be configured as an input signal of other combinational logic circuits (if the circuit system still has other combinational logic circuits not shown in FIG. 3), or configured as the scan verification.

The scanning flip-flop of the key generation unit $PFF_3$ is configured to receive an output signal of the combinational logic circuit $CBC_3$, the scanning serial signal SI through the scanning flip-flop of the key generation unit $PFF_2$, the clock signal CK and the scanning enable signal SE. The scanning flip-flop of the key generation unit $PFF_3$ also outputs a signal $Q_3$. The key generation unit $PFF_3$ is also electrically connected to a node of the combinational logic circuit $CBC_3$ to receive a node data. The key generation unit $PFF_3$ outputs a value $R_3$ of the key based on the clock signal CK. The signal $Q_3$ may be configured as an input signal of other combinational logic circuits (if the circuit system still has other combinational logic circuits not shown in FIG. 3), or configured as the scan verification.

The scanning flip-flops $SFF_1$, $SFF_2$, $SFF_3$ and the scanning flip-flop of the key generation units $PFF_1$, $PFF_2$ and $PFF_3$ are connected in series to form a scanning path with the design for testability, so that the scan verification can be performed by the launch on capture. Furthermore, while performing the scan verification, the key generation units $PFF_1$, $PFF_2$ and $PFF_3$ also correspondingly generate the values $R_1$, $R_2$ and $R_3$ of the key. In this embodiment, the scanning flip-flops $SFF_1$, $SFF_2$, $SFF_3$, the scanning flip-flop of the key generation units $PFF_1$, $PFF_2$ and $PFF_3$ and the data flip-flops of the key generation units $PFF_1$, $PFF_2$ and $PFF_3$ configured to generate the values $R_1$, $R_2$ and $R_3$ of the key are designed to be rising edge triggered (that is, being triggered when the clock signal CK is changed from a logic low level to a high logic level). The clock signal processing units of the key generation units $PFF_1$, $PFF_2$ and $PFF_3$ are inverters, so that the key generation units $PFF_1$, $PFF_2$ and $PFF_3$ generate inverted clock signals as the node clock signals to trigger the data flip-flops of the key generation key which are configured to generate the values $R_1$, $R_2$ and $R_3$ of the key. Further, in another embodiment, the scanning flip-flops $SFF_1$, $SFF_2$, $SFF_3$ and the scanning flip-flop of the key generation units $PFF_1$, $PFF_2$ and $PFF_3$ are designed as rising edge triggered, while the data flip-flops of the key generation units $PFF_1$, $PFF_2$ and $PFF_3$ which are configured to generate the values $R_1$, $R_2$ and $R_3$ of the key are designed to be falling edge triggered (that is, being triggered when the clock signal CK is changed from the logic high level to the logic low level). Besides, the key generation units $PFF_1$, $PFF_2$ and $PFF_3$ are not provided with the clock signal processing unit.

In FIG. 3, assuming that the transmission delay time from the input end of the combinational logic circuits $CBC_1$, $CBC_2$ and $CBC_3$ to the output end of the combinational logic circuits $CBC_1$, $CBC_2$ and $CBC_3$ is 5 nanoseconds, and K is set to be 0.5. Then, the duty cycle of the clock signal CK when the scanning enable signal SE is disabled is 2.5 nanoseconds. Thus, it is necessary to find out the node of which the transmission delay time from the input end of each of the combination logic circuits $CBC_1$, $CBC_2$ and $CBC_3$ to each node is less than or equal to 2.5 nanosecond to be electrically connected to the data flip-flops of the key generation units $PFF_1$, $PFF_2$ and $PFF_3$ which are configured to generate the values $R_1$, $R_2$ and $R_3$ of the key. For example, the transmission delay time from the input of each of the combinational logic circuits $CBC_1$, $CBC_2$ and $CBC_3$ to an intermediate node is 2.5 nanoseconds. Then, the intermediate nodes of the combinational logic circuits $CBC_1$, $CBC_2$ and $CBC_3$ are electrically connected to the data flip-flops of the key generation units $PFF_1$, $PFF_2$ and $PFF_3$ which are configured to generate the values $R_1$, $R_2$ and $R_3$ of the key, respectively. All in all, the node data signal corresponding to the node of the combination logic circuits $CBC_1$, $CBC_2$ and $CBC_3$ to which the data flip-flops of the generation units $PFF_1$, $PFF_2$ and $PFF_3$ which are configured to generate the values $R_1$, $R_2$ and $R_3$ of the key is to be connected must complete the transition within the duty cycle of the clock signal CK.

Figure 4:
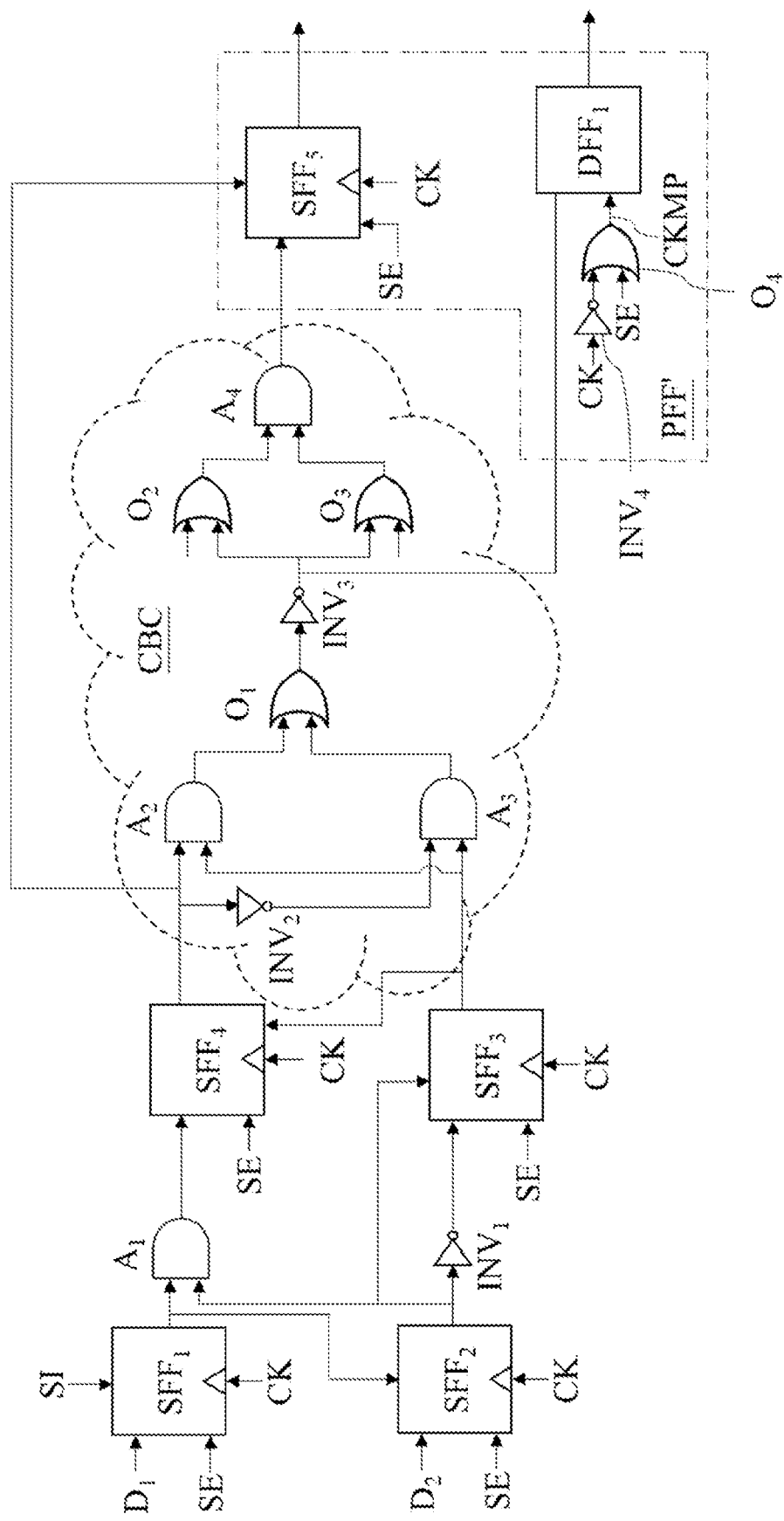
FIG. 4 is a key generator with a physical unclonable function in a circuit system according to another embodiment of the present disclosure.

Next, referring to FIG. 4, FIG. 4 is a key generation unit with a physical unclonable function in a circuit system according to another embodiment of the present disclosure. In this embodiment, a circuit system comprises a key generation unit PFF', a plurality of combinational logic circuits (one of the combinational logic circuits is the combinational logic circuit CBC, the other two combinational logic circuits is comprised with an AND gate $A_1$ and an inverter $INV_1$), and a plurality of scanning flip-flops $SFF_1$-$SFF_5$ (the scanning flip-flop of the key generation unit PFF' uses the scanning flip-flop $SFF_5$).

In this embodiment, the scanning flip-flop $SFF_1$ is configured to receive the data signal $D_1$, the scanning serial data signal SI, the clock signal CK and the scanning enable signal SE. The output end of the scanning flip-flop $SFF_1$ is electrically connected to an input end of the AND gate $A_1$ and one end of the scanning flip-flop $SFF_2$ configured to receive the scanning serial data signal SI. The scanning flip-flop $SFF_2$ is configured to receive the data signal $D_2$, the scanning serial data signal SI through the scanning flip-flop $SFF_1$, the clock signal CK and the scanning enable signal SE. The output end of the scanning flip-flop $SFF_2$ is electrically connected to other one end of the AND gate $A_1$, one end of the scanning flip-flop $SFF_3$ configured to receive the scanning serial data signal SI and an input end of the inverter $INV_1$. The scanning flip-flop $SFF_3$ is configured to receive a signal from an output end of the inverter $INV_1$ as the data signal, and receive the scanning serial data signal SI through the scanning flip-flop $SFF_2$, the clock signal CK and the scanning enable signal SE. The output end of the scanning flip-flop $SFF_3$ is electrically connected to an input end of the combinational logic circuit CBC and one end of the scanning flip-flop $SFF_4$ which is configured to receive the scanning serial data signal SI. The scanning flip-flop $SFF_4$ is configured to receive a signal from an output end of the AND gate $A_1$ as the data signal, and receive the scanning serial data signal SI through the scanning flip-flop $SFF_3$, the clock signal CK and the scanning enable signal SE. An output end of the scanning flip-flop $SFF_4$ is electrically connected to the other input end of the combinational logic circuit CBC and one end of the scanning flip-flop $SFF_5$ of the key generation unit PFF' which is configured to receive the scanning serial data signal SI. The scanning flip-flop $SFF_5$ of the key generation unit PFF' is configured to receive a signal from an output end of the combinational logic circuit CBC as the data signal, and receive the scanning serial data signal SI through the scanning flip-flops $SFF_4$, the clock signal CK and the scanning enable signal SE. The signal from the output end of the scanning flip-flop $SFF_4$ may be configured as an input signal of other combinational logic circuits (if the circuit system still has the combinational logic circuit not shown in FIG. 3), or configured as the scan verification.

The combinational logic circuit CBC comprises inverters $INV_2$, $INV_3$, AND gates $A_2$, $A_3$, $A_4$, and OR gates $O_1$, $O_2$, $O_3$. One input end of the AND gate $A_2$ is electrically connected to the output end of the scanning flip-flop $SFF_3$, and other input end of the AND gate $A_2$ is electrically connected to the output end of the scanning flip-flop $SFF_4$. An input end of the inverter $INV_2$ is electrically connected to the output end of the scanning flip-flop $SFF_4$. One input end of the AND gate $A_3$ is electrically connected to the output end of the scanning flip-flop $SFF_3$, and other input end of the AND gate $A_3$ is electrically connected to an output end of the inverter $INV_2$. One input end of the OR gate $O_1$ is electrically connected to an output end of the AND gate $A_2$, and other input end of the OR gate $O_1$ is electrically connected to an output end of the AND gate $A_3$. An input end of the inverter $INV_3$ is electrically connected to an output end of the OR gate $O_1$, and an output end of the inverter $INV_3$ is electrically connected to input ends of the OR gates $O_2$ and $O_3$. One input end of the AND gate $A_4$ is electrically connected to an output end of the OR gate $O_2$, and other input end of the AND gate $A_4$ is electrically connected to an output end of the OR gate $O_3$. An output end of the AND gate $A_4$ is electrically connected to the scanning flip-flop $SFF_5$ of the key generation unit PFF', and an output signal of the AND gate $A_4$ is configured as the data signal received by the scanning flip-flop $SFF_5$.

In this embodiment, the transmission delay time of each of the inverters $INV_2$ and $INV_3$ is 1 nanosecond, and the transmission delay time of each of the AND gates $A_2$, $A_3$ and $A_4$ and the OR gates $O_1$, $O_2$ and $O_3$ is 1.5 nanoseconds. Thus, the transmission delay time from the input end of the combinational logic circuit CBC to the output end of the combinational logic circuit CBC is 8 nanoseconds. The transmission delay time from the input end of the combinational logic circuit CBC to a node of the output end of the inverter $INV_3$ is 5 nanoseconds. Thus, the node at the output end of the inverter $INV_3$ is selected to output the node data signal to the data flip-flop $DFF_1$ of the key generation unit PFF'. Correspondingly, the clock signal CK must have a duty cycle greater than or equal to 5 nanoseconds when the scanning enable signal SE is disabled, so that the node data signal can be transitioned.

In this embodiment, the scan verification of the design for testability of the circuit system adopts the launch off shift. Moreover, the data flip-flop $DFF_1$ and the scanning flip-flop $SFF_1$-$SFF_5$ are all designed to be rising edge triggered. Thus, the clock signal processing unit must be designed to generate the node clock signal CKMP with the logic high level when the scanning enable signal SE is enabled. As well, the clock signal processing unit generates the node clock signal CKMP which is inversed to the clock signal CK when the scanning enable signal SE is disabled. Based on the above, the clock signal processing unit comprises an inverter $INV_4$ and an OR gate $O_4$, and the OR gate $O_4$ is electrically connected to the data flip-flop $DFF_1$. The inverter $INV_4$ is configured to receive the clock signal CK to generate an inverted clock signal. The OR gate $O_4$ is configured to perform a logical OR operation on the inverted clock signal and the scanning enable signal SE to generate the node clock signal CKMP.

Figure 5:
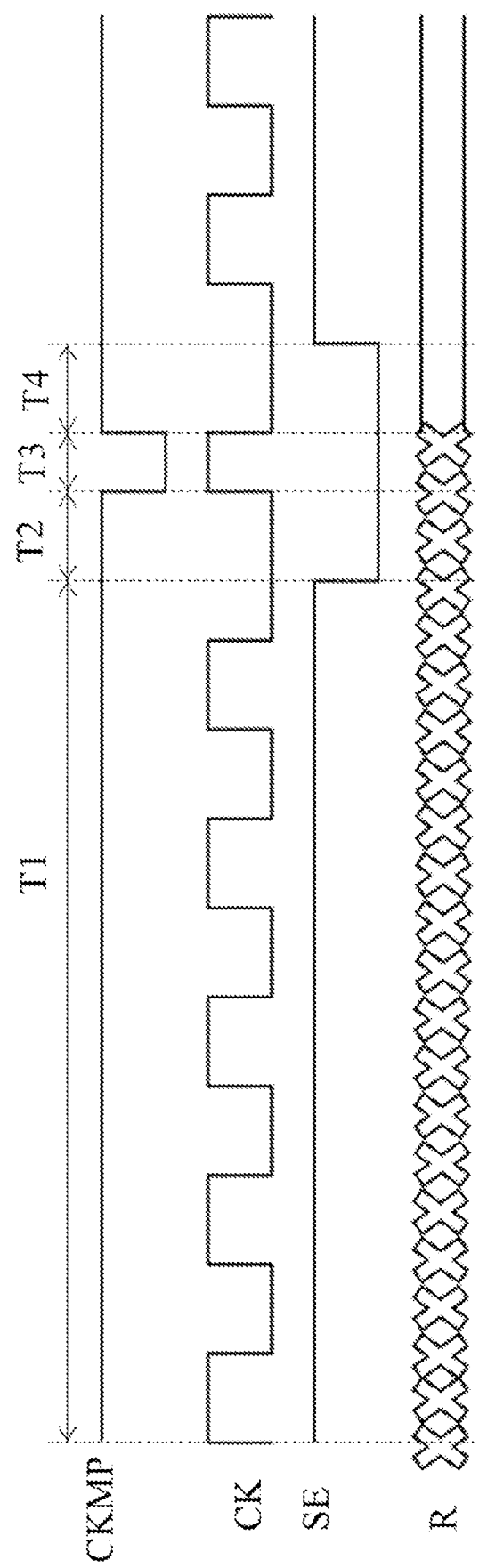
FIG. 5 is a schematic waveform diagram of a value of a key for generating the key by the key generation unit with the physical unclonable function of FIG. 4.

Referring to FIG. 4 and FIG. 5 at the same time, FIG. 5 is a schematic waveform diagram of a value of the key used by the key generation unit with the physical unclonable function of FIG. 4. Firstly, during an operation period T1, values of the scanning flip-flops $SFF_1$-$SFF_5$ are initialized. Therefore, the scanning enable signal SE is enabled and 5 clock cycles of the clock signal CK (5 times from the logic low level to the logic high level) are required during the operation period T1 to set the values of the scanning flip-flops $SFF_1$-$SFF_5$ through the scanning serial data signal SI which is input. Assuming that the value (a logical value) of the scanning serial data signal SI in 5 clock cycles is 11001, the value of the scanning flip-flops $SFF_1$-$SFF_5$ is 11001 before the end of the operation period T1, and the value of the node data signal at the output end of the inverter $INV_3$ is 1.

During an operation period T2, the scanning enable signal SE is set to be disabled. Then, during an operation period T3, the clock signal CK is changed from the logic low level to the logic high level, and the duty cycle of the clock signal CK is made 5 nanoseconds. Correspondingly, the node clock signal CKMP is changed from the logic high level to the logic low level. After lasting for 5 nanoseconds, the node clock signal CKMP with the logic low level is changed to the logic high level. During the operation period T3, a rising edge of the clock signal CK makes the value of the scanning flip-flop $SFF_3$ change from 0 to 1, so that the value of the scanning flip-flop $SFF_4$ is changed from 1 to 0, and the duty cycle of the clock signal CK is 5 nanoseconds. Hence, the node data signal at the output end of the inverter $INV_3$ can be transitioned, so as to make the value change from 1 to 0. When the node clock signal CKMP is changed from the logic low level to logic high level, the data flip-flop $DFF_1$ is triggered to capture the node data signal to output the value of the node data signal as the value R of the key. Next, in an operation period T4, the clock signal CK becomes the logic low level for a period of time, and then ends. During the operation period T4, the value R of the key is able to accessed, and the values of the scanning flip-flops $SFF_1$-$SFF_5$ is able to be captured for performing the scan verification. After the operation period T4 ends, the scanning enable signal SE can be enabled to perform another initialization before the scan verification.

Figure 6:
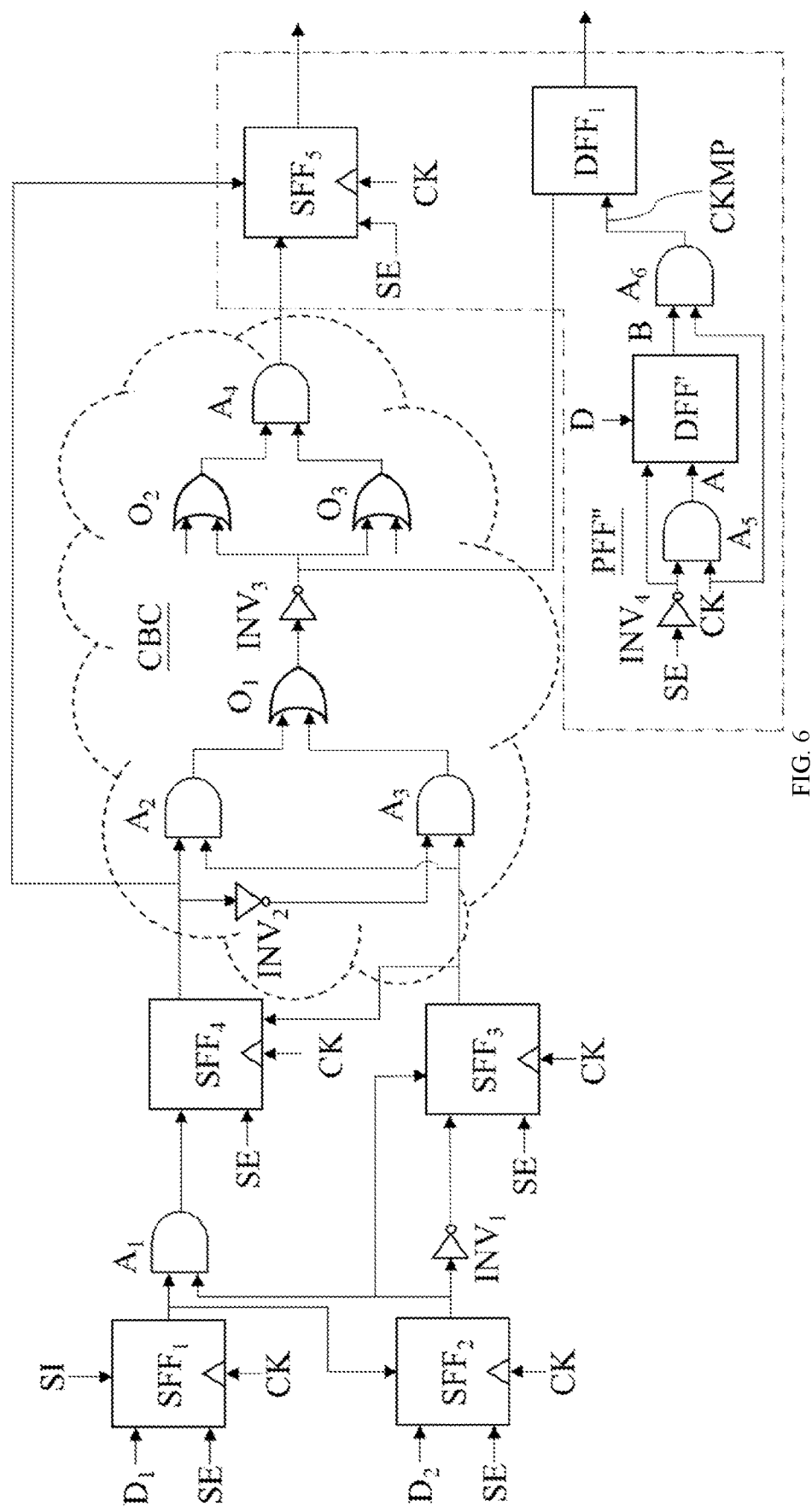
FIG. 6 is a key generation unit with a physical unclonable function in a circuit system according to another embodiment of the present disclosure.

Referring to FIG. 6, FIG. 6 is a key generation unit with a physical unclonable function in a circuit system according to another embodiment of the present disclosure. Different from the embodiment of FIG. 4, this embodiment is suitable for adopting the design for testability with the launch on capture. Therefore, except that the clock signal processing unit of the key generation unit PFF" is different from the clock signal processing unit of the key generation unit PFF" in FIG. 4, other parts of the circuit system are completely the same as those in FIG. 4. Hence, only the clock signal processing unit of the key generation unit PFF" is introduced here.

In this embodiment, the scan verification of the design for testability in the circuit system adopts the launch on capture. Also, the scanning flip-flops $SFF_1$-$SFF_5$ are designed to be rising edge triggered, while the data flip-flop $DFF_1$ is designed to be falling edge triggered. Thus, the clock signal processing unit must be designed to generation the node clock signal CKMP with the low logic level when the scanning enable signal SE is enabled. As well, in the case of the scanning enable signal SE being disabled, the node clock signal CKMP which is the same as the clock signal CK is generated when the clock signal CK is changed from the logic low level to the logic high level for the second times. Based on the above, the clock signal processing unit comprises the inverter $INV_4$, AND gates $A_5$, $A_6$, and a data flip-flop DFF'. The inverter $INV_4$ is configured to receive the scanning enable signal SE to generate an inverted scanning enable signal. The AND gate $A_5$ is configured to perform a logical AND operation on the inverted scanning enable signal and the clock signal CK to generate a first signal A. The data flip-flop DFF' is configured to receive the data signal D at the logic high level, the data flip-flop DFF' is reset according to the scanning enable signal SE, and the data flip-flop DFF' outputs the data signal D as a second signal B based on an edge of the first signal A being triggered. The AND gate $A_6$ is configured to perform the logical AND operation on the second signal B and the clock signal CK to generate the node clock signal CKMP.

Figure 7:
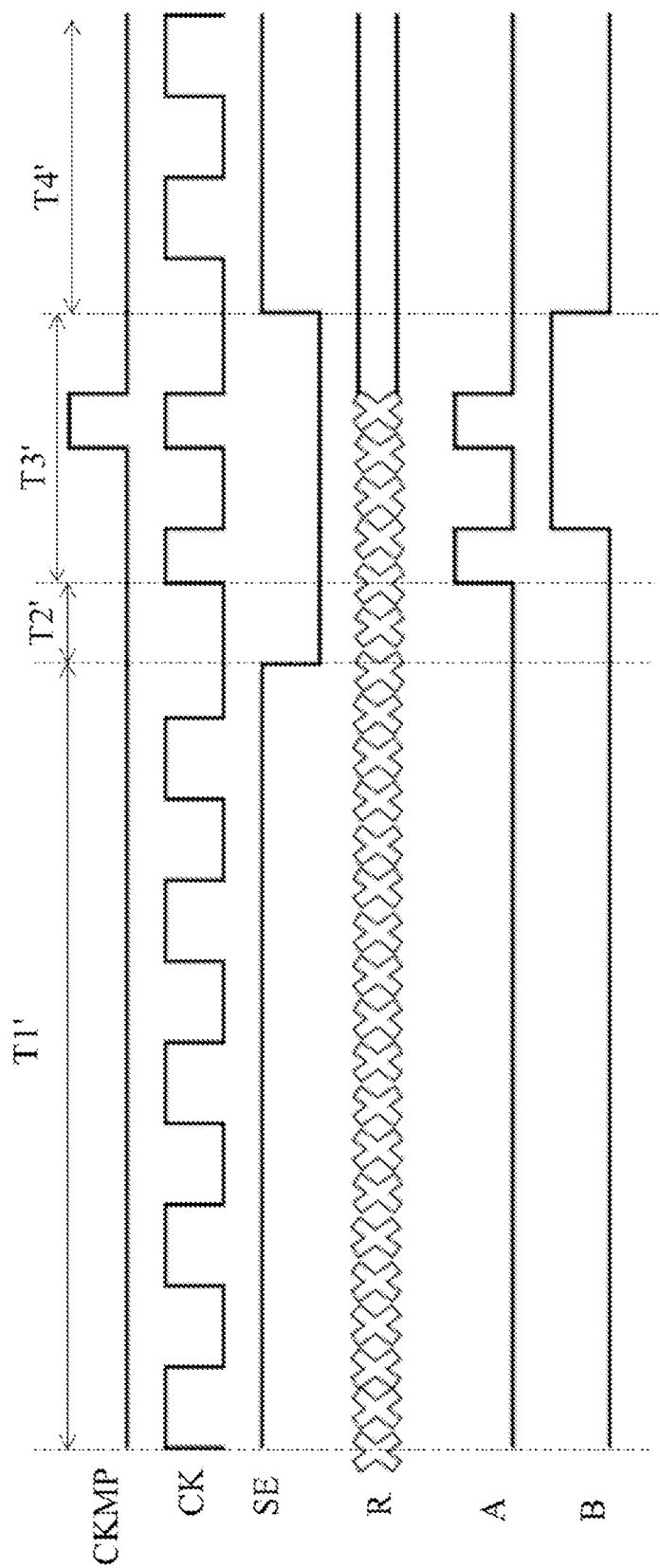
FIG. 7 is a schematic waveform diagram of a value of a key for generating the key by the key generation unit with the physical unclonable function of FIG. 6.

Referring to FIG. 6 and FIG. 7 at the same time, FIG. 7 is a schematic waveform diagram of a value of the key used by the key generation unit with the physical unclonable function of FIG. 6. Firstly, the description of an operation period T1' is the same as the description of the operation period T1 in FIG. 5, so it will not be repeated here. Assuming that the value (the logical value) of the scanning serial data signal SI in five clock cycles is 11001, the value of the scanning flip-flops $SFF_1$-$SFF_5$ is 11001 before the end of the operation period T1. As well, the value of the node data signal on the output end of the inverter $INV_3$ is 1.

During an operation period T2', the scanning enable signal SE is disabled. Then, during an operation period T3', the clock signal CK is changed from the logic low level to the logic high level for the first time, and the duty cycle of the clock signal CK is made be 5 nanoseconds. Correspondingly, the first signal A is changed from the logic low level to the high level. After 5 nanosecond, the first signal A is changed to the logic low level. Then, the second signal B is changed from the logic low level to the logic high level. Afterwards, during the operation period T3', the clock signal CK is changed from the logic low level to the logic high level for the second time. The duty cycle is made 5 nanoseconds, and then the first signal A is changed from the logic low level to the logic high level again. The node clock signal CKMP is also generated, which is the same as the clock signal CK.

During the operation period T3', due to the two rising edges of the clock signal CK, the values of the scanning flip-flops $SFF_1$-$SFF_4$ are changed as follows. The value of the scanning flip-flop $SFF_1$ is changed from 1 to 1, and changed from 1 to 1. The value of the scanning flip-flop $SFF_2$ is changed from 0 to 1, and changed from 1 to 1. The value of the scanning flip-flop $SFF_3$ is changed from 0 to 1, and changed from 1 to 1. The value of the scanning flip-flop $SFF_4$ is changed from 1 to 0, and changed from 0 to 1. The duty cycle of the clock signal CK is 5 nanoseconds, so as to make the node data signal at the output end of the inverter $INV_3$ be transitioned twice, which makes the value be changed from 1 to 0, and then change from 0 to 1. Then, a falling edge of the node clock signal CKMP triggers the data flip-flip $DFF_1$ to capture the node data signal to output the value of the node data signal as the value R of the key. After the operation period T3' ends, an operation period T4' is entered, so as to make the scanning enable signal SE be enabled. The second signal B is changed from the logic high level to the logic low level, and another initialization before the scan verification is performed.

In the view of the above, the embodiments of the present disclosure provide a technology that can be combined in the scan verification of the design for testability to generate a key. The embodiments of the present disclosure utilize the mechanism of the launch on capture or the launch off shift to perform the scan verification and obtain the key at the same time. Furthermore, the key generation technology of the embodiments of the present disclosure does not additionally set a combinational logic circuit on the original path of the scanning flip-flop. Instead, multiple values of the key are generated by using the plurality of existing combinational logic circuits in the circuit system. As a result, there is no timing error problem caused during the scan verification in the related art.

It should be understand that the examples and the embodiments described herein are for illustrative purpose only, and various modifications or changes in view of them will be suggested to those skilled in the art, and will be included in the spirit and scope of the application and the appendix with the scope of the claims.

What is claimed is:

1. A key generation unit with a physical unclonable function, comprising:
   a multiplexer, electrically connected to one of a plurality of combinational logic circuits in a circuit system, and configured to output one of a data signal and a scanning series data signal received by the multiplexer based on a scanning enable signal, wherein the data signal is from an output end of the one of the combinational logic circuits;
   only one first data flip-flop, electrically connected to the multiplexer, and configured to receive one of the data signal and the scanning series data signal received by the multiplexer;
   wherein the first data flip-flop outputs the data signal or the scanning series data signal based on an edge of a clock signal being triggered;
   wherein the multiplexer and the first data flip-flop form one of a plurality of scanning flip-flops in the circuit system; and
   a second data flip-flop, directly electrically connected to the one of the combinational logic circuits, and configured to receive a node data signal of a node in the one of the combinational logic circuits;
   wherein when the scanning enable signal is disabled, the second data flip-flop outputs the node data signal as a part of a key based on an edge of a node clock signal being triggered; and wherein the node clock signal is the clock signal, or the node clock signal is generated based on the clock signal; and
   wherein a first transmission delay time from an input end of the one of the combinational logic circuits to the node of the one of the combinational logic circuits is K times a second transmission delay time from the input end of the combinational logic circuits to the output end of the one of the combinational logic circuits, wherein K is less than 1.

2. The key generation unit according to claim 1, wherein when the scanning enable signal is disabled, a duty cycle of the clock signal is not less than K times the second transmission delay time.

3. The key generation unit according to claim 2, wherein the first data flip-flop is a rising edge triggered type, and the second data flip-flop is a falling edge triggered type, or
   the first data flip-flop and the second data flip-flop are rising edge triggered types.

4. The key generation unit according to claim 2, wherein the key generation unit further comprises:
   a clock signal processing unit, electrically connected to the second data flip-flop, and configured to generate the node clock signal according to the scanning enable signal and the clock signal.

5. The key generation unit according to claim 4, wherein the clock signal processing unit is an inverter.

6. The key generation unit according to claim 4, wherein the clock signal processing unit is configured to generate the node clock signal with a logic high level when the scanning enable signal is enabled; and
   wherein the clock signal processing unit is configured to generate the node clock signal inverse to the clock signal when the scanning enable signal is disabled, and the clock signal processing unit is configured to generate the node clock signal the same as the clock signal when the clock signal is changed from the logic low level to the logic high level for the second time, so that the key generation unit is suitable for the circuit system with a design for testability adopting a launch off shift.

7. The key generation unit according to claim 6, wherein the clock signal processing unit comprises an inverter and an OR gate, and the OR gate is electrically connected to the inverter and the second data flip-flop;
wherein the inverter is configured to receive the clock signal to generate an inverted clock signal, and the OR gate is configured to perform a logical OR operation on the inverted clock signal and the scanning enable signal to generate the node clock signal.

8. The key generation unit according to claim 4, wherein in the case of the scanning enable signal being enabled, the clock signal processing unit is configured to generate the node clock signal with a low logic level; and
wherein in the case of the scanning enable signal being disabled, the clock signal processing unit is configured to generate the node clock signal which is the same as the clock signal when the clock signal is changed from the logic low level to the logic high level for a second time, so that the key generation unit is suitable for the circuit system with design for testability adopting a launch on capture.

9. The key generation unit according to claim 8, wherein the clock signal processing unit comprises an inverter, a first AND gate, a second AND gate and a third data flip-flop;
wherein the inverter is configured to receive the scanning enable signal to generate an inverted scanning enable signal,
the first AND gate is configured to perform a logical AND operation on the inverted scanning enable signal and the clock signal to generate a first signal,
the third data flip-flop is configured to receive a specific data signal with the logic high level, the third data flip-flop is reset according to the scanning enable signal, and the third data flip-flop is configured to output the specific data signal as a second signal based on an edge of the first signal being triggered, and
the second AND gate is configured to perform the logic AND operation on the second signal and the clock signal to generate the node clock signal.

10. The key generation unit according to claim 2, wherein K is greater than or equal to 0.5, and the duty cycle of the clock signal is equal to K times the second transmission delay time.

11. A key generator, comprising:
a plurality of key generation units, and the plurality of key generator units with a physical unclonable function, wherein each of the plurality of key generation units comprises:
a multiplexer, electrically connected to one of a plurality of combinational logic circuits in a circuit system, and configured to output a data signal or a scanning series data signal received by the multiplexer based on a scanning enable signal, wherein the data signal is from an output end of the one of the combinational logic circuits;
only one first data flip-flop, electrically connected to the multiplexer, and configured to receive the data signal or the scanning series data signal received by the multiplexer;
wherein the first data flip-flop outputs the data signal or the scanning series data signal based on an edge of a clock signal being triggered;
wherein the multiplexer and the first data flip-flop form one of a plurality of scanning flip-flops in the circuit system; and
a second data flip-flop, directly electrically connected to the one of the combinational logic circuits, and configured to receive a node data signal of a node in the one of the combinational logic circuits;
wherein when the scanning enable signal is disabled, the second data flip-flop outputs the node data signal as a part of a key based on an edge of a node clock signal being triggered; and wherein the node clock signal is the clock signal, or the node clock signal is generated based on the clock signal; and
wherein a first transmission delay time from an input end of the one of the combinational logic circuits to the node of the one of the combinational logic circuits is K times a second transmission delay time from the input end of the combinational logic circuits to the output end of the one of the combinational logic circuits, wherein K is less than 1;
wherein the one of the combinational logic circuits to which one of the plurality of key generation units is electrically connected is different from another one of the combination logic circuits to which another one of the plurality of key generation units is electrically connected.

12. The key generator according to claim 11, wherein when the scanning enable signal is disabled, a duty cycle of the clock signal is not less than K times the second transmission delay time.

13. The key generator according to claim 12, wherein the first data flip-flop is a rising edge triggered type, and the second data flip-flop is a falling triggered type, or
the first data flip-flop and the second data flip-flop are rising edge triggered types.

14. The key generator according to claim 12, wherein each of the key generation units further comprises:
a clock signal processing unit, electrically connected to the second data flip-flop, and configured to generate the node clock signal according to the scanning enable signal and the clock signal.

15. The key generator according to claim 14, wherein the clock signal processing unit is an inverter.

16. The key generator according to claim 14, wherein the clock signal processing unit is configured to generate the node clock signal with a logic high level when the scanning enable signal is enabled; and
wherein the clock signal processing unit is configured to generate the node clock signal inverse to the clock signal when the scanning enable signal is disabled, and the clock signal processing unit is configured to generate the node clock signal the same as the clock signal when the clock signal is changed from the logic low level to the logic high level for the second time, so that the key generation unit is suitable for the circuit system with a design for testability adopting a launch off shift.

17. The key generator according to claim 16, wherein the clock signal processing unit comprises an inverter and an OR gate, and the OR gate is electrically connected to the inverter and the second data flip-flop;
wherein the inverter is configured to receive the clock signal to generate an inverted clock signal, and the OR gate is configured to perform a logical OR operation on the inverted clock signal and the scanning enable signal to generate the node clock signal.

18. The key generator according to claim 14, wherein in the case of the scanning enable signal being enabled, the clock signal processing unit is configured to generate the node clock signal with a low logic level; and wherein in the case of the scanning enable signal being disabled, the clock signal processing unit is configured to generate the node clock signal which is the same as the clock signal when the clock signal is changed from the logic low level to the logic high level for a second time, so that the key generation unit is suitable for the circuit system with design for testability adopting launch on capture.

19. The key generator according to claim 18, wherein the clock signal processing unit comprises an inverter, a first AND gate, a second AND gate and a third data flip-flop;

wherein the inverter is configured to receive the scanning enable signal to generate an inverted scanning enable signal;

the first AND gate is configured to perform a logical operation on the inverted scanning enable signal and the clock signal to generate a first signal;

the third data flip-flop is configured to receive a specific data signal with the logic high level, the third data flip-flop is reset according to the scanning enable signal, and the third data flip-flop is configured to output the specific data signal as a second signal based on an edge of the first signal being triggered; and the second AND gate is configured to perform the logic AND operation on the second signal and the clock signal to generate the node clock signal.

20. A circuit system, comprising:

a key generator, comprising:

a plurality of key generation units, and the plurality of key generator units with a physical unclonable function, wherein each of the plurality of key generation units comprises:

a multiplexer, electrically connected to one of a plurality of combinational logic circuits in a circuit system, and configured to output a data signal or a scanning series data signal received by the multiplexer based on a scanning enable signal, wherein the data signal is from an output end of the one of the combinational logic circuits;

only one first data flip-flop, electrically connected to the multiplexer, and configured to receive the data signal or the scanning series data signal received by the multiplexer;

wherein the first data flip-flop outputs the data signal or the scanning series data signal based on an edge of a clock signal being triggered;

wherein the multiplexer and the first data flip-flop form one of a plurality of scanning flip-flops in the circuit system; and a second data flip-flop, directly electrically connected to the one of the combinational logic circuits, and configured to receive a node data signal of a node in the one of the combinational logic circuits;

wherein when the scanning enable signal is disabled, the second data flip-flop outputs the node data signal as a part of a key based on an edge of a node clock signal being triggered; and wherein the node clock signal is the clock signal, or the node clock signal is generated based on the clock signal; and wherein a first transmission delay time from an input end of the one of the combinational logic circuits to the node of the one of the combinational logic circuits is K times a second transmission delay time from the input end of the combinational logic circuits to the output end of the one of the combinational logic circuits, wherein K is less than 1;

wherein the one of the combinational logic circuits to which one of the plurality of key generation units is electrically connected is different from another one of the combination logic circuits to which another one of the plurality of key generation units is electrically connected;

the plurality of combinational logic circuits, electrically connected to the plurality of key generation units of the key generator; and the plurality of scanning flip-flops, electrically connected to the plurality of combinational logic circuits.

* * * * *